(12) United States Patent
Syed et al.

(10) Patent No.: US 10,549,706 B2
(45) Date of Patent: Feb. 4, 2020

(54) BATTERY PACK MOUNTING ASSEMBLY

(71) Applicant: FORD GLOBAL TECHNOLOGIES, LLC, Dearborn, MI (US)

(72) Inventors: Shamsuddin A. Syed, Canton, MI (US); Ihab Grace, Grosse Pointe Woods, MI (US); Afif Sabbagh, Troy, MI (US); Ahteram Khan, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 261 days.

(21) Appl. No.: 15/630,126

(22) Filed: Jun. 22, 2017

(65) Prior Publication Data

US 2018/0370467 A1 Dec. 27, 2018

(51) Int. Cl.
*B60R 16/04* (2006.01)
*H01M 2/10* (2006.01)
*B60L 50/64* (2019.01)
*B60L 50/60* (2019.01)

(52) U.S. Cl.
CPC .............. *B60R 16/04* (2013.01); *B60L 50/64* (2019.02); *B60L 50/66* (2019.02); *H01M 2/1083* (2013.01); *H01M 2220/20* (2013.01)

(58) Field of Classification Search
CPC ....................................................... B60R 16/04
See application file for complete search history.

(56) References Cited

U.S. PATENT DOCUMENTS

| | | | |
|---|---|---|---|
| 7,614,469 B2 | 11/2009 | Kumar et al. | |
| 7,997,368 B2 | 8/2011 | Takasaki et al. | |
| 8,336,657 B2 * | 12/2012 | Dobbins | B60R 25/00 180/68.5 |
| 8,557,436 B2 | 10/2013 | Schwab | |
| 8,720,627 B2 * | 5/2014 | Suzuki | B60R 16/04 180/68.5 |
| 8,720,976 B2 * | 5/2014 | Oyama | B60H 1/2209 296/187.09 |
| 8,833,499 B2 | 9/2014 | Rawlinson | |
| 9,517,686 B1 * | 12/2016 | Paramasivam | B60K 1/04 |
| 10,069,123 B2 * | 9/2018 | Maguire | H01M 2/1083 |
| 2007/0215399 A1 * | 9/2007 | Watanabe | B60K 1/04 180/68.5 |
| 2009/0226806 A1 * | 9/2009 | Kiya | B60K 1/04 429/186 |
| 2011/0162902 A1 * | 7/2011 | Dobbins | B60R 25/00 180/68.5 |
| 2012/0312613 A1 * | 12/2012 | Suzuki | B60R 16/04 180/68.5 |

(Continued)

FOREIGN PATENT DOCUMENTS

| KR | 100257872 B1 | 6/2000 |
|---|---|---|
| KR | 101534873 B1 | 7/2015 |

(Continued)

*Primary Examiner* — James A Shriver, II
*Assistant Examiner* — Vaughn Coolman
(74) *Attorney, Agent, or Firm* — David B. Kelley; Carlson, Gaskey & Olds

(57) ABSTRACT

An electrified vehicle includes a vehicle frame, a battery pack mounted to the vehicle frame, a primary bracket secured to each of the vehicle frame and the battery pack, and a support bracket secured to the battery pack and the primary bracket. The support bracket increases the stiffness of the primary bracket.

7 Claims, 6 Drawing Sheets

(56) References Cited

U.S. PATENT DOCUMENTS

| | | | | |
|---|---|---|---|---|
| 2013/0037335 A1* | 2/2013 | Sakamoto | ............ | H05K 5/0204 |
| | | | | 180/65.8 |
| 2014/0158443 A1* | 6/2014 | Lee | ......................... | B60R 16/04 |
| | | | | 180/68.5 |
| 2015/0280183 A1* | 10/2015 | Utley | .................. | H01M 2/1016 |
| | | | | 429/99 |

FOREIGN PATENT DOCUMENTS

| | | |
|---|---|---|
| WO | 2012/067360 A2 | 5/2012 |
| WO | 2013/103211 A1 | 11/2013 |

* cited by examiner

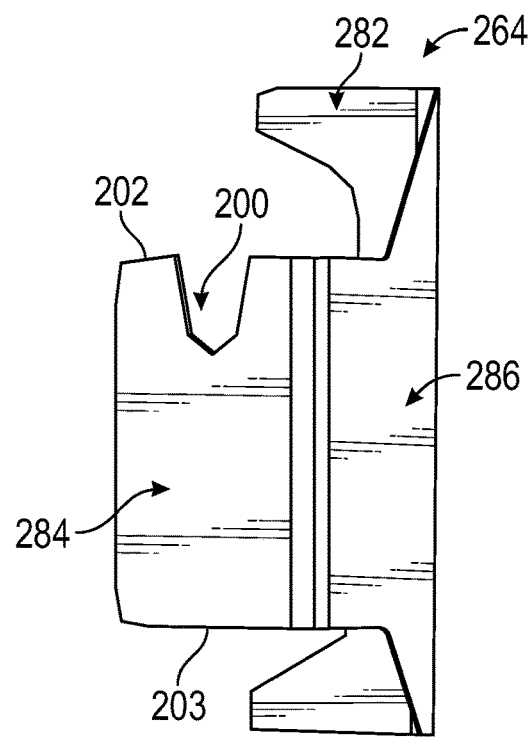
FIG. 6A
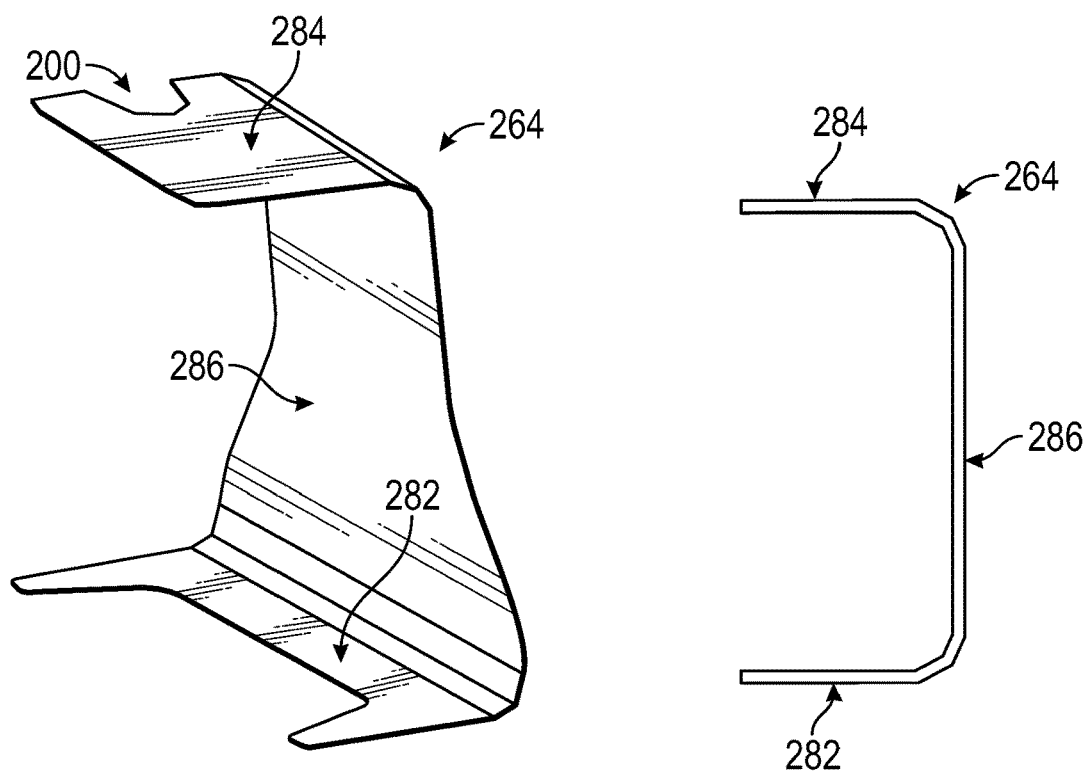
FIG. 6B
FIG. 6C

BATTERY PACK MOUNTING ASSEMBLY

TECHNICAL FIELD

This disclosure relates to mounting battery packs to electrified vehicles. An exemplary mounting assembly for mounting a battery pack to a vehicle frame includes a frequency enhancing support bracket for improving the vibration characteristics of the mounted battery pack.

BACKGROUND

The desire to reduce automotive fuel consumption and emissions has been well documented. Electrified vehicles are being developed for reducing or completely eliminating reliance on internal combustion engines. In general, electrified vehicles differ from conventional motor vehicles because they are selectively driven by one or more battery powered electric motors. Conventional motor vehicles, by contrast, rely exclusively on the internal combustion engine to drive the vehicle.

A high voltage battery pack typically powers the electric motor of an electrified vehicle. The high voltage battery pack is commonly attached to the vehicle frame using various attachments and supports. These attachments and supports must be designed to meet noise, vibration, and harshness requirements of the electrified vehicle.

SUMMARY

An electrified vehicle according to an exemplary aspect of the present disclosure includes, among other things, a vehicle frame, a battery pack mounted to the vehicle frame, a primary bracket secured to each of the vehicle frame and the battery pack, and a support bracket secured to the battery pack and the primary bracket.

In a further non-limiting embodiment of the foregoing electrified vehicle, the primary bracket is secured to a tray of an enclosure of the battery pack.

In a further non-limiting embodiment of either of the foregoing electrified vehicles, the primary bracket includes a base and a bracket arm that protrudes from the base.

In a further non-limiting embodiment of any of the foregoing electrified vehicles, the support bracket is secured to the bracket arm of the primary bracket and to a tray of an enclosure of the battery pack.

In a further non-limiting embodiment of any of the foregoing electrified vehicles, the bracket arm includes a first arm section that extends generally parallel to a sidewall of the battery pack and a second arm section that protrudes at a transverse angle from the first arm section.

In a further non-limiting embodiment of any of the foregoing electrified vehicles, the second arm section includes an opening that receives a fastener for mounting the battery pack to the vehicle frame.

In a further non-limiting embodiment of any of the foregoing electrified vehicles, the support bracket includes a first mounting tab mounted to the battery pack, a second mounting tab mounted to the primary bracket, and a wall that extends between the first mounting tab and the second mounting tab.

In a further non-limiting embodiment of any of the foregoing electrified vehicles, a predefined failure area is formed in the second mounting tab.

In a further non-limiting embodiment of any of the foregoing electrified vehicles, the predefined failure area includes a notch.

In a further non-limiting embodiment of any of the foregoing electrified vehicles, the first mounting tab includes a distal end portion that is spaced from the wall and includes a contoured profile.

In a further non-limiting embodiment of any of the foregoing electrified vehicles, a weld bead follows the contoured profile to connect the first mounting tab to the batter pack.

In a further non-limiting embodiment of any of the foregoing electrified vehicles, the weld bead includes at least one curved portion.

In a further non-limiting embodiment of any of the foregoing electrified vehicles, the support bracket includes at least one notch that establishes a predefined failure area in the support bracket.

In a further non-limiting embodiment of any of the foregoing electrified vehicles, the support bracket includes a Z-shaped configuration.

In a further non-limiting embodiment of any of the foregoing electrified vehicles, the support bracket includes a C-shaped configuration.

A method according to another exemplary aspect of the present disclosure includes, among other things, securing a battery pack to a vehicle frame with a mounting assembly that includes a primary bracket and a support bracket. The support bracket extends between the battery pack and the primary bracket to increase the stiffness of the primary bracket.

In a further non-limiting embodiment of the foregoing method, securing the battery pack includes welding the primary bracket to an enclosure of the battery pack and mechanically fastening the primary bracket to the vehicle frame.

In a further non-limiting embodiment of either of the foregoing methods, securing the battery pack includes welding the support bracket to an enclosure of the battery pack with a first weld bead and welding the support bracket to the primary bracket with a second weld bead.

In a further non-limiting embodiment of any of the foregoing methods, the first weld bead extends along a non-linear path and the second weld bead extends along a linear path.

In a further non-limiting embodiment of any of the foregoing methods, the support bracket includes a predefined failure area.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIGS. 6A, 6B, and 6C illustrate yet another exemplary support bracket of a battery pack mounting assembly.

DETAILED DESCRIPTION

This disclosure details mounting assemblies for securing a battery pack to an electrified vehicle. An exemplary battery pack mounting assembly for an electrified vehicle includes a primary bracket mounted to each of the battery pack and a vehicle frame, and a support bracket mounted to each of the battery pack and the primary bracket. The support bracket increases the stiffness of the primary bracket, thereby improving the vibrational characteristics of the mounted battery pack. These and other features of this disclosure are described in greater detail below.

Figure 1:
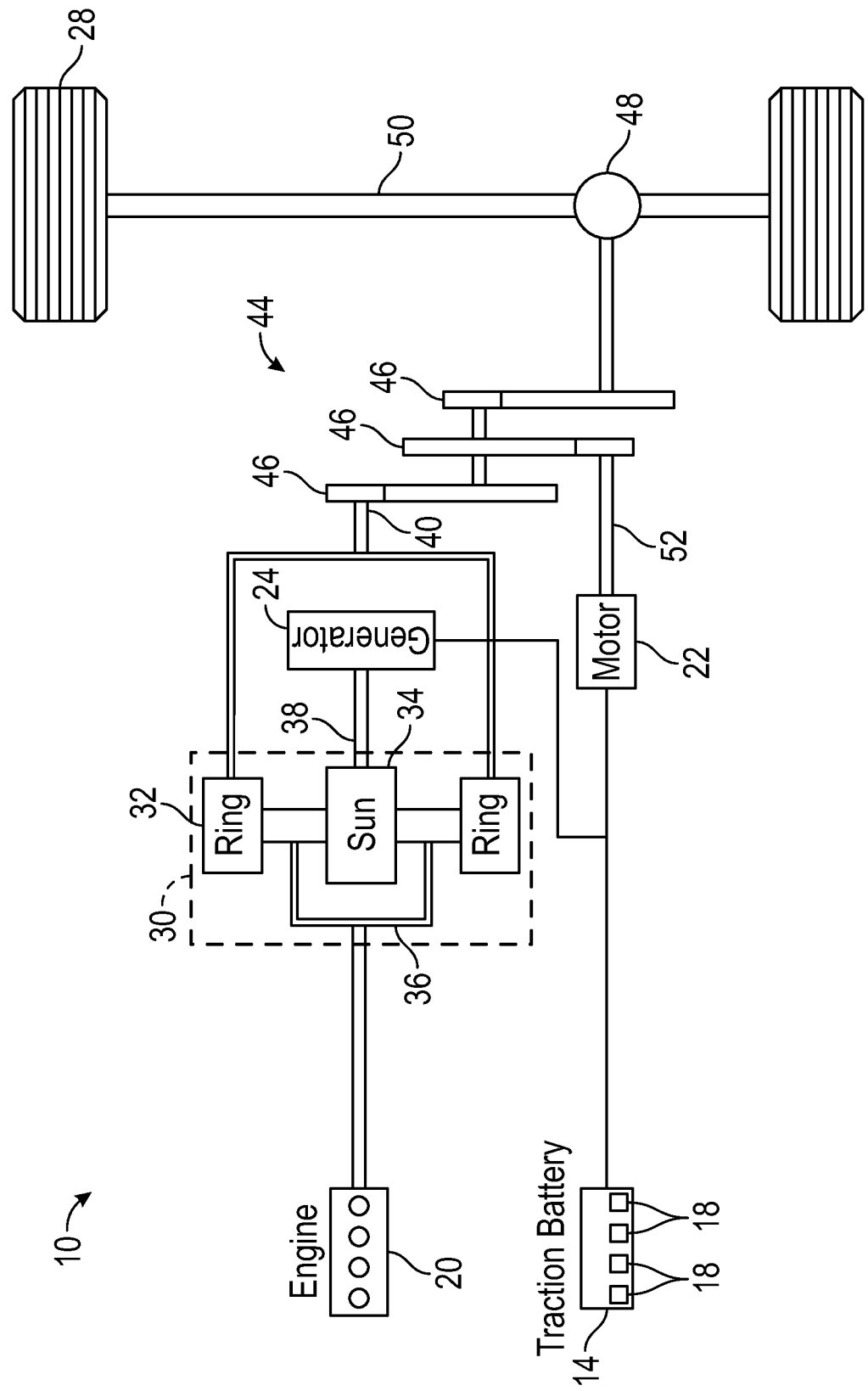
FIG. 1 schematically illustrates a powertrain of an electrified vehicle.

FIG. 1 schematically illustrates a powertrain 10 for an electrified vehicle. Although depicted as a hybrid electric vehicle (HEV), it should be understood that the concepts described herein are not limited to HEVs and could extend to any other type of electrified vehicle, including, but not limited to, plug-in hybrid electric vehicles (PHEVs), battery electric vehicles (BEVs), fuel cell vehicles, etc.

The powertrain 10 includes a battery pack 14 having a plurality of battery arrays 18, an internal combustion engine 20, a motor 22, and a generator 24. The battery pack 14 may be a high voltage traction battery pack. The motor 22 and the generator 24 are types of electric machines. The motor 22 and generator 24 may be separate or have the form of a combined motor-generator.

In an embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the battery pack 14. The motor 22 and the generator 24 may establish an electric drive system of the powertrain 10.

The engine 20 and the generator 24 can be connected through a first power transfer unit 30, such as a planetary gear set. Of course, other types of power transfer units, including other gear sets and transmissions, can be used to operably connect the engine 20 to the generator 24. In an embodiment, the first power transfer unit 30 is a planetary gear set that includes a ring gear 32, a sun gear 34, and a carrier assembly 36.

The generator 24 can be driven by the engine 20 through the first power transfer unit 30 to convert kinetic energy to electrical energy. The generator 24 can alternatively function as a motor to convert electrical energy into kinetic energy, thereby outputting torque to a shaft 38 connected to the first power transfer unit 30.

The ring gear 32 of the first power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. Although not shown in the highly schematic depiction of FIG. 1, the differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 52 that is also connected to the second power transfer unit 44. In an embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the battery pack 14.

Figure 2:
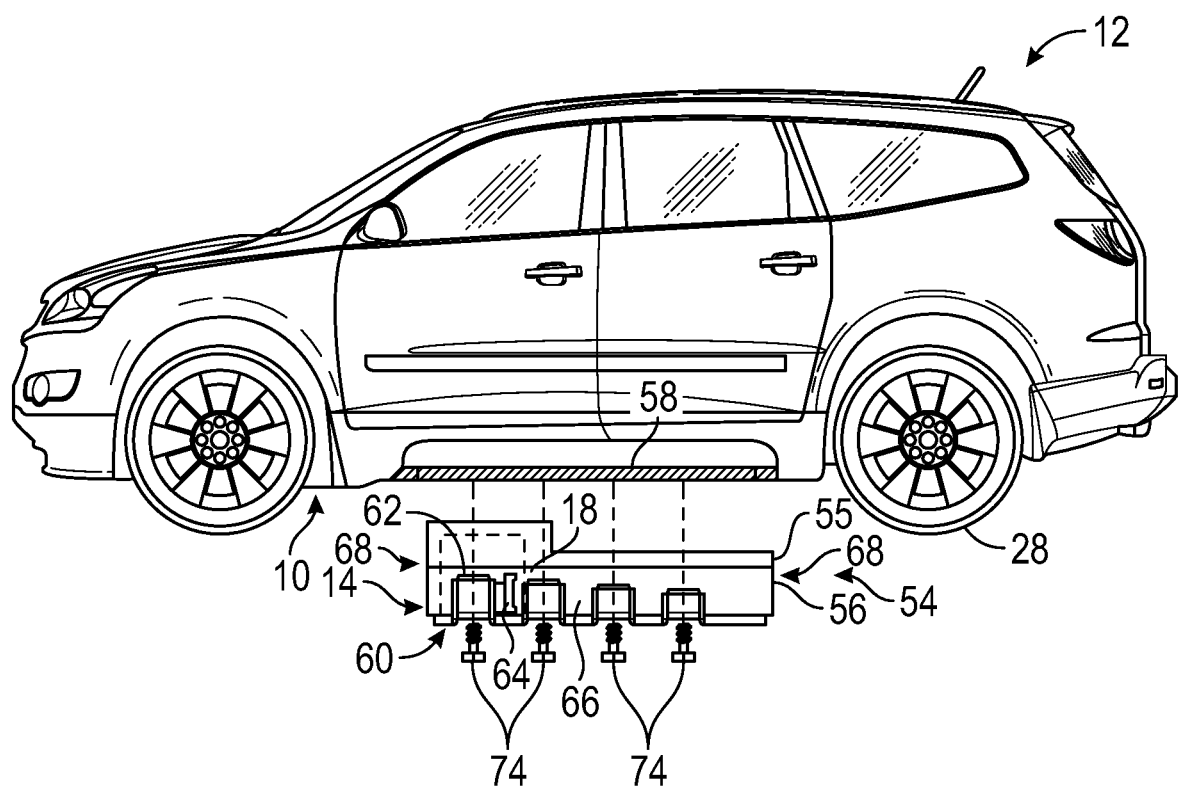
FIG. 2 is a side view of an electrified vehicle equipped with the powertrain of FIG. 1. A battery pack of the powertrain is shown being mounted to the electrified vehicle.

FIG. 2 illustrates an electrified vehicle 12 that is equipped with the powertrain 10 of FIG. 1. The battery pack 14 of the powertrain 10 may house one or more battery arrays 18 (e.g., groupings of battery cells) within an enclosure 54. The enclosure 54 may include a cover 55 and a tray 56. The cover 55 is secured to the tray 56 to enclose the battery arrays 18 and other electronic components of the battery pack 14. In an embodiment, the enclosure 54 is a metallic structure. However, the enclosure 54 could be made of other materials, including polymeric materials.

The battery pack 14 may be secured to a frame 58 of the electrified vehicle 12 by at least one mounting assembly 60. In an embodiment, the frame 58 is part of a chassis of the electrified vehicle 12. When secured to the frame 58, the battery pack 14 is suspended from an underbody of the electrified vehicle 12 and is outside a passenger compartment of the electrified vehicle 12.

In an embodiment, the battery pack 14 is secured to the frame 58 by at least two mounting assemblies 60, with one mounting assembly 60 secured to each sidewall 66 of the battery pack 14 (only one sidewall 66 shown in FIG. 2). In another embodiment, the battery pack 14 is secured to the frame 58 using mounting assemblies 60 that are secured to each endwall 68 of the battery pack 14. In yet another embodiment, the battery pack 14 is secured to the frame 58 using four mounting assemblies 60, with one mounting assembly 60 secured to each sidewall 66 and each endwall 68 of the battery pack 14. The number of mounting assemblies 60 employed to mount the battery pack 14 may vary depending on a variety of factors, including but not limited to, the size, shape, and weight of the battery pack 14.

Figure 3:
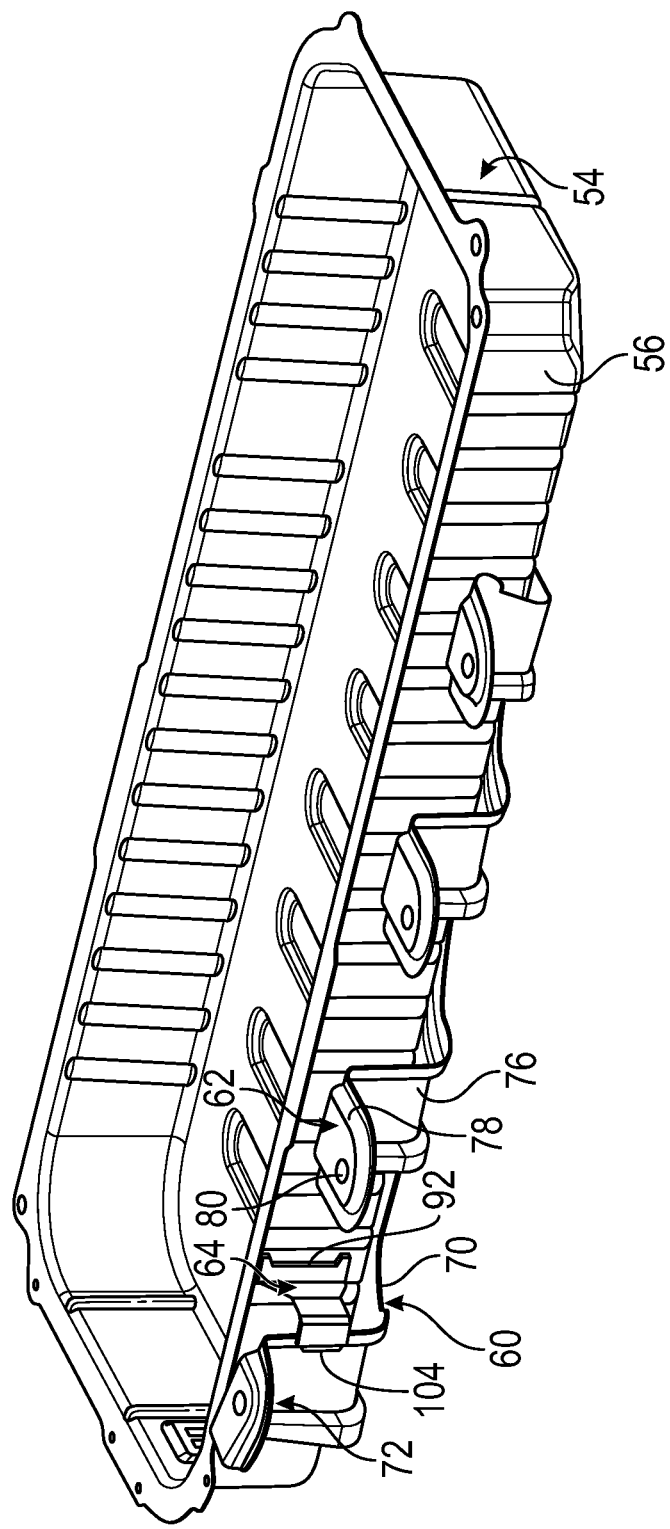
FIG. 3 illustrates a mounting assembly for securing a battery pack to an electrified vehicle.

Referring now to FIGS. 2 and 3, each mounting assembly 60 may include at least one primary bracket 62 and at least one support bracket 64. In an embodiment, the primary bracket 62 is secured to the enclosure 54 (e.g., to the tray 56) and to the frame 58 for mounting the battery pack 14 to the frame 58. For example, the primary bracket 62 may include a base 70 that is welded to the enclosure 54 and at least one bracket arm 72 that is mechanically fastened to the frame 58 using one or more fasteners 74. The frame 58 may include hardware for accommodating the fasteners 74.

In another embodiment, a plurality of bracket arms 72 protrude upwardly from the base 70 (i.e., in a direction toward the frame 58) of the primary bracket 62. The total number of bracket arms 72 provided on the primary bracket 62 is not intended to limit this disclosure. Each bracket arm 72 may include a first arm section 76 that extends generally parallel to the sidewall 66 of the battery pack 14 and a second arm section 78 that protrudes at a transverse angle from the first arm section 76. Each second arm section 78 is thus generally parallel to the frame 58. The second arm section(s) 78 may include an opening 80 for receiving one of the fasteners 74 for affixing the battery pack 14 to the frame 58.

The support bracket 64 may be secured to the enclosure 54 (e.g., the tray 56) and the primary bracket 62. The support bracket 64 could be either welded (e.g., spot welded or MIG welded) or mechanically attached to each of the enclosure 54 and the primary bracket 62. In an embodiment, the support bracket 64 extends between the enclosure 54 and at least one of the bracket arms 72 of the primary bracket 62. Although only a single support bracket 64 is illustrated in FIGS. 2 and 3, the mounting assembly 60 could include multiple support brackets 64 that extend between the enclosure 54 and one or more of the bracket arms 72 of the primary bracket 62. The support bracket 64 increases the stiffness of the primary bracket 62 to meet normal mode frequency requirements, safety requirements, and durability requirements associated with the battery pack 14.

In an embodiment, the primary bracket 62 and the support bracket 64 are made of the same type of material or combination of materials. However, in another embodiment, the support bracket 64 is made from a thinner gage of material compared to the primary bracket 62.

Figure 4A:
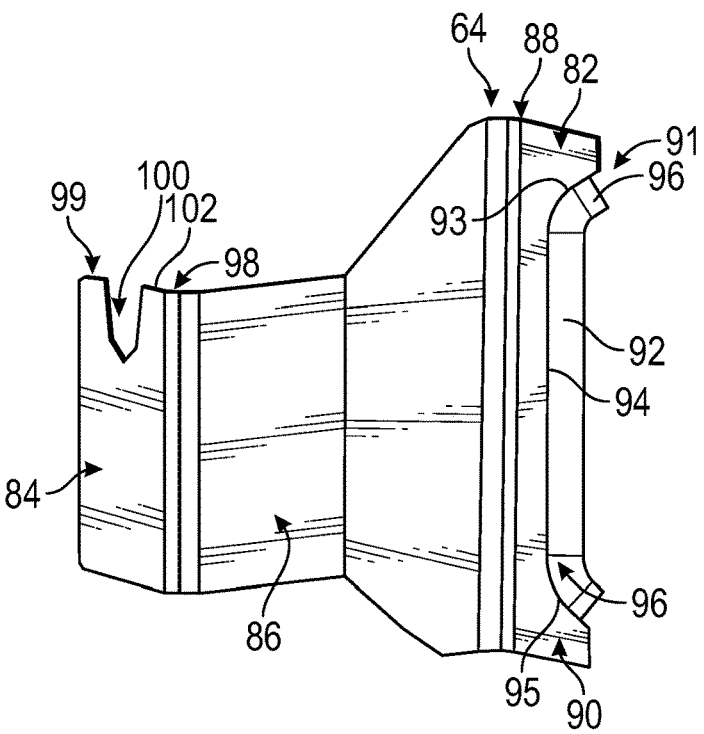
FIGS. 4A, 4B, and 4C illustrate an exemplary support bracket of a battery pack mounting assembly.
Figure 4B:
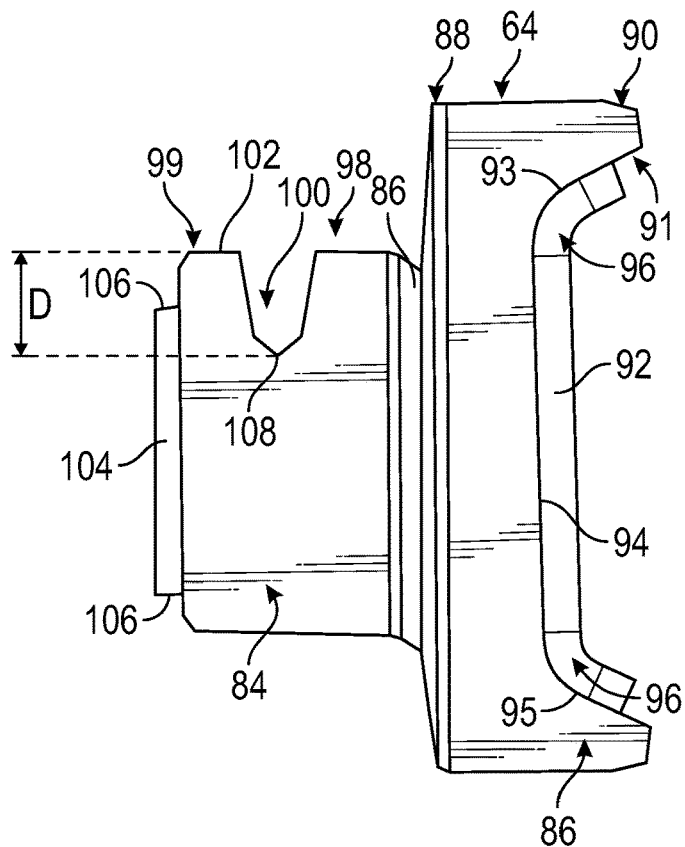
Figure 4C:
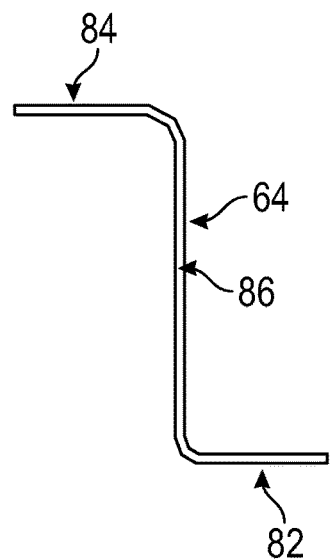

FIGS. 4A-4C, with continued reference to FIGS. 1-3, illustrate additional details of the support bracket 64 of the exemplary mounting assembly 60 described above. The support bracket 64 may include a first mounting tab 82, a second mounting tab 84, and a wall 86 that extends between the first mounting tab 82 and the second mounting tab 84. Together, the first mounting tab 82, the second mounting tab 84, and the wall 86 establish a monolithic structure having no mechanical fasteners. The first mounting tab 82 and the second mounting tab 84 may protrude in opposite directions from the wall 86. Therefore, in this embodiment, the support bracket 64 is generally Z-shaped. The Z-shaped configuration is best illustrated in FIG. 4C. However, other shapes are also contemplated within the scope of this disclosure (see, e.g., the embodiment of FIGS. 6A, 6B, and 6C).

When mounted, the first mounting tab 82 of the support bracket 64 interfaces with the enclosure 54, the second mounting tab 84 interfaces with the primary bracket 62, and the wall 86 may extend at a nearly perpendicular angle relative to the enclosure 54 (see FIG. 3). This increases the stiffness of the primary bracket 62, thereby improving the vibrational characteristics of the battery pack 14 once it has been mounted to the frame 58.

The first mounting tab 82 extends between a proximal end portion 88, which is connected to the wall 86, and a distal end portion 90, which is spaced from the wall 86. The distal end portion 90 may include a contoured profile 91 for accommodating a weld bead 92 for fixedly securing the support bracket 64 to the enclosure 54. In an embodiment, the contoured profile 91 includes a first surface 93 that extends in a direction toward the proximal end portion 88, a second surface 94 that extends in parallel with the proximal end portion 88, and a third surface 95 that extends in a direction away from the proximal end portion 88. When mounting the support bracket 64 to the enclosure 54, the weld bead 92 may be created by following the path of the contoured profile 91. The weld bead 92 will thus include at least one curved portion 96 for avoiding stress concentrations at the interface between the first mounting tab 82 and the enclosure 54 (e.g., the tray 56). The weld bead 92 thus extends along a non-linear path.

Figure 5:
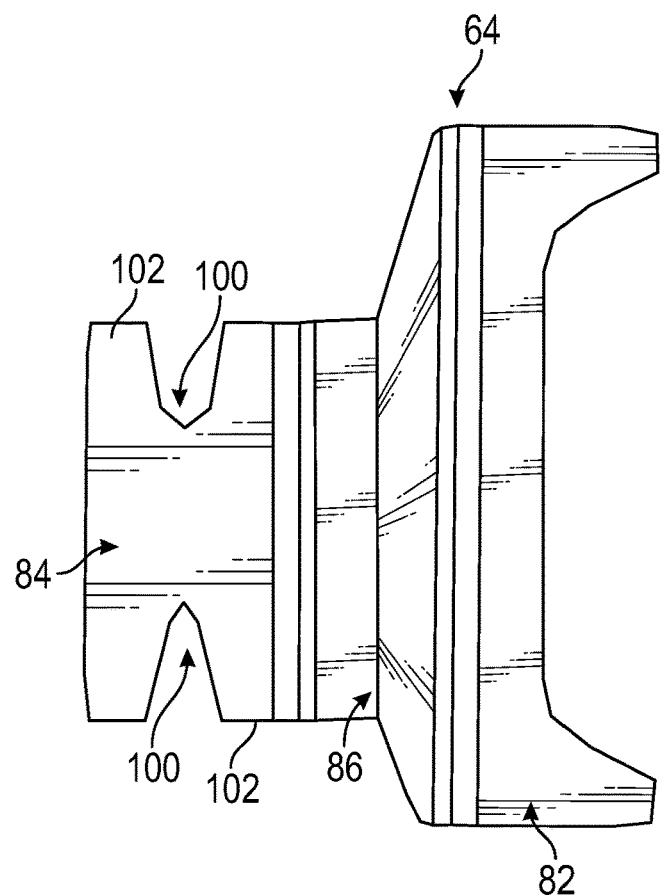
FIG. 5 illustrates another exemplary support bracket of a battery pack mounting assembly.

The second mounting tab 84 may also extend between a proximal end portion 98, which is connected to the wall 86, and a distal end portion 99, which is spaced from the wall 86. In an embodiment, a notch 100 is formed in an edge 102 of the second mounting tab 84 at a location that is between the proximal end portion 98 and the distal end portion 99. The edge 102 may be a top edge or bottom edge of the second mounting tab 82 when viewed in the mounted position. In another embodiment, the second mounting tab 84 may include at least one notch 100 formed in both top and bottom edges 102 of the second mounting tab 82 (see, e.g., FIG. 5). The notch or notches 100 create a predefined failure area in the second mounting tab 84 of the support bracket 64. Therefore, in the event of any impact event (e.g., front, side, rear, side pole, etc.), the second mounting tab 84 can shear through the notch or notches 100, thus dissipating energy and minimizing intrusion into the enclosure 54.

The support bracket 64 may be secured to the primary bracket 62 by providing a weld bead 104 (see FIGS. 3 and 4B) along a lateral edge of the distal end portion 99 of the second mounting tab 84. The weld bead 104 extends along a linear path between opposing weld bead ends 106. In an embodiment, a depth D of the notch 100 extends deeper into the second mounting tab 84 than the location of the end 106 of the weld bead 104 that is located on the same side as the notch 100 (see FIG. 4B). In other words, the distance to a floor 101 of the notch 100 is a greater distance from the edge 102 than the end 106 of the weld bead 104. Therefore, during an impact event, the impact load is directed at the notch 100 and is not heavily shared by the weld bead 104.

FIGS. 6A, 6B, and 6C illustrate another exemplary support bracket 264 for use within a battery pack mounting assembly. The support bracket 264 is similar to the support bracket 64 described above but is illustrated to demonstrate another packaging option provided by the mounting assemblies of this disclosure. The support bracket 264 may include a first mounting tab 282, a second mounting tab 284, and a wall 286 that extends between the first mounting tab 282 and the second mounting tab 284. Together, the first mounting tab 282, the second mounting tab 284, and the wall 286 establish a monolithic structure. The first mounting tab 282 and the second mounting tab 284 may protrude in the same direction away from the wall 286. Therefore, in this embodiment, the support bracket 264 is generally C-shaped. The C-shaped configuration is best illustrated in FIG. 6C.

The support bracket 264 may additionally include one or more notches 200. In an embodiment, a notch 200 is formed in a top edge 202 (when viewed from a mounted position of the support bracket 264) of the second mounting tab 284, a bottom edge 203 of the second mounting tab 284, or both. The notch or notches 200 create a predefined failure area in the second mounting tab 284 of the support bracket 264. Therefore, in the event of any impact event, the second mounting tab 284 can shear through the notch or notches 200, thus dissipating energy and minimizing intrusion into the battery pack enclosure 54.

The battery pack mounting assemblies of this disclosure include one or more support brackets. The support brackets increase the stiffness of primary brackets of the mounting assembly, thus improving the vibration performance of the battery pack once mounted to a vehicle frame while simultaneously satisfying safety and durability requirements. Together, the primary brackets and the support brackets provide a modular mounting assembly that is relatively lightweight.

Although the different non-limiting embodiments are illustrated as having specific components or steps, the embodiments of this disclosure are not limited to those particular combinations. It is possible to use some of the components or features from any of the non-limiting

What is claimed is:

1. An electrified vehicle, comprising:
    a vehicle frame;
    a battery pack mounted to the vehicle frame;
    a primary bracket secured to each of the vehicle frame and the battery pack;
    a support bracket secured to the battery pack and the primary bracket;
    wherein the support bracket includes a first mounting tab mounted to the battery pack, a second mounting tab mounted to the primary bracket, and a wall that extends between the first mounting tab and the second mounting tab;
    wherein the first mounting tab includes a distal end portion that is spaced from the wall and includes a contoured profile; and
    a weld bead that follows the contoured profile to connect the first mounting tab to the battery pack.

2. The electrified vehicle as recited in claim 1, wherein the weld bead includes at least one curved portion.

3. A method, comprising:
    securing a battery pack to a vehicle frame with a mounting assembly that includes a primary bracket and a support bracket, wherein the support bracket extends between the battery pack and the primary bracket to increase the stiffness of the primary bracket,
    wherein securing the battery pack includes:
    welding the primary bracket to an enclosure of the battery pack; and
    mechanically fastening the primary bracket to the vehicle frame.

4. The method as recited in claim 3, wherein the support bracket includes a predefined failure area.

5. A method comprising:
    securing a battery pack to a vehicle frame with a mounting assembly that includes a primary bracket and a support bracket, wherein the support bracket extends between the battery pack and the primary bracket to increase the stiffness of the primary bracket,
    wherein securing the battery pack includes:
    welding the support bracket to an enclosure of the battery pack with a first weld bead; and
    welding the support bracket to the primary bracket with a second weld bead.

6. The method as recited in claim 5, wherein the first weld bead extends along a non-linear path and the second weld bead extends along a linear path.

7. An electrified vehicle, comprising:
    a vehicle frame;
    a battery pack mounted to the vehicle frame;
    a primary bracket secured to each of the vehicle frame and the battery pack;
    a support bracket secured to each of the battery pack and the primary bracket;
    a first weld bead securing the support bracket to the battery pack; and
    a second weld bead securing the support bracket to the primary bracket.

\* \* \* \* \*